United States Patent
Choi et al.

(10) Patent No.: US 10,422,863 B2
(45) Date of Patent: Sep. 24, 2019

(54) SCANNING LIDAR HAVING OPTICAL STRUCTURE THAT SHARES A TRANSMISSION RECEIVING LENS

(71) Applicant: KOREA ELECTRONICS TECHNOLOGY INSTITUTE, Seongnam-si, Gyeonggi-do (KR)

(72) Inventors: Hyunyong Choi, Gwangju (KR); Chouljun Choi, Gwangju (KR); Seunghun Oh, Gwangju (KR); Hyunchang Cho, Gwangju (KR); Seungjoo Lee, Gwangju (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 15/314,880

(22) PCT Filed: Mar. 10, 2016

(86) PCT No.: PCT/KR2016/002378
§ 371 (c)(1),
(2) Date: Nov. 29, 2016

(87) PCT Pub. No.: WO2017/099297
PCT Pub. Date: Jun. 15, 2017

(65) Prior Publication Data
US 2018/0275251 A1   Sep. 27, 2018

(30) Foreign Application Priority Data
Dec. 11, 2015   (KR) .................. 10-2015-0177248

(51) Int. Cl.
*G01C 3/08* (2006.01)
*G01S 7/481* (2006.01)
(Continued)

(52) U.S. Cl.
CPC ............ *G01S 7/4817* (2013.01); *G01S 7/483* (2013.01); *G01S 7/4812* (2013.01);
(Continued)

(58) Field of Classification Search
CPC ...... G01S 7/4817; G01S 7/483; G01S 7/4816; G01S 7/4812; G01S 7/4815; G01S 17/42; G01S 17/10; G01S 17/936; G01S 17/89
See application file for complete search history.

(56) References Cited

U.S. PATENT DOCUMENTS 6,879,419 B2 * 4/2005 Richman ................ G02B 13/06
                                                    359/203.1
7,259,838 B2    8/2007 Carlhoff et al.
(Continued)

FOREIGN PATENT DOCUMENTS

KR       10-0305876 B1     11/2001

OTHER PUBLICATIONS

International Search Report dated Jul. 29, 2016 in International Application No. PCT/KR2016/002378, filed Mar. 10, 2016.

*Primary Examiner* — Mark Hellner
(74) *Attorney, Agent, or Firm* — Knobbe Martens Olson & Bear LLP (57) ABSTRACT

One aspect is a scanning light detection and ranging (LiDAR) having an optical structure which shares a transmitting and receiving lens. In one embodiment, the LiDAR includes a hole mirror disposed to have a first angle with respect to a horizontal surface and including a hole and a reflecting surface and a beam source configured to output a pulsed laser beam from one side of the hole mirror toward the hole. The LiDAR also includes a transmitting and receiving lens configured to generate a collimated beam to move the pulsed laser beam which passed through the hole toward a measurement target, receive a beam reflected from
(Continued)

the measurement target, and transmit the reflected beam to the hole mirror. The LiDAR further includes a beam detector disposed to face the reflecting surface of the hole mirror and configured to receive the beam reflected from the hole mirror and convert the reflected beam into an electronic signal.

7 Claims, 4 Drawing Sheets

(51) Int. Cl.
  *G01S 7/483*    (2006.01)
  *G01S 17/10*    (2006.01)
  *G01S 17/42*    (2006.01)
  *G01S 17/89*    (2006.01)
  *G01S 17/93*    (2006.01)

(52) U.S. Cl.
  CPC .......... *G01S 7/4815* (2013.01); *G01S 7/4816* (2013.01); *G01S 17/10* (2013.01); *G01S 17/42* (2013.01); *G01S 17/89* (2013.01); *G01S 17/936* (2013.01)

(56) References Cited

U.S. PATENT DOCUMENTS

| | | | |
|---|---|---|---|
| 7,580,117 B2* | 8/2009 | Okada | G01S 7/4812 356/4.01 |
| 9,874,117 B2* | 1/2018 | Oh | F01L 1/3442 |
| 2005/0179888 A1 | 8/2005 | Kallio | |
| 2008/0316463 A1* | 12/2008 | Okada | G01S 7/4812 356/4.01 |
| 2012/0154783 A1 | 6/2012 | Goldberg et al. | |
| 2015/0055117 A1 | 2/2015 | Pennecot et al. | |
| 2016/0011311 A1* | 1/2016 | Mushimoto | G02B 26/0816 250/236 |
| 2016/0209510 A1* | 7/2016 | Sakabe | G01S 17/42 |

\* cited by examiner

SCANNING LIDAR HAVING OPTICAL STRUCTURE THAT SHARES A TRANSMISSION RECEIVING LENS

FIELD

The described technology relates to a scanning light detection and ranging (LIDAR) having an optical structure which shares a transmitting and receiving lens.

DESCRIPTION OF THE RELATED TECHNOLOGY

Recently, active response capabilities of vehicles for unexpected situations are required in the fields of intellectual vehicles and smart cars. That is, a need to determine a situation which threatens safety of a driver and a pedestrian in advance, such as recognizing a sudden appearance of a pedestrian, sensing an obstacle in advance in a place beyond a range of light on a dark night, sensing an obstacle when it is raining and headlights are not bright, sensing a damaged road in advance, or the like is required To this end, a scanner which is installed at a windshield or in the front of a vehicle determines an object in front of the vehicle on the basis of light emitted from the vehicle when the vehicle moves, warns a driver thereof, and captures and sends an image, which is a reference for the vehicle to stop or avoid the object, to an electronic control unit (ECU) of the vehicle, and the ECU performs various controls using the image.

A radio detection and ranging (RADAR) apparatus has been used as a conventional scanner. A RADAR is a wireless monitor which irradiates an object with electromagnetic waves on the level of microwaves (wavelength of 10 cm to 100 cm) and receives the electromagnetic waves reflected by the object to recognize a distance to the object, a direction and an altitude of the object, and the like, and is used as a scanner for a vehicle, but there is a problem in that spread thereof to various kinds of vehicles is not easy due to its high price.

To solve such a problem, a scanner using a light detection and ranging (LiDAR) is being developed. A LiDAR is an apparatus which radiates a pulsed laser beam into the atmosphere to measure a distance, an atmospheric phenomenon, and the like using a reflecting object or scattering object and is also known as a laser RADAR. Time measurement of a reflective beam is performed by calculating clock pulses and has a resolution of five meters using a frequency of 30 MHz and one meter using a frequency of 150 MHz.

Nowadays, a 360° LiDAR is being developed as a LiDAR installed in a vehicle. A conventional scanning LiDAR technology has an optical structure which condenses and radiates a diffused beam output from a high power laser diode in parallel beams through i) a collimation lens, in which a beam signal reflected by an object is positioned at a detector positioned at a focal distance through ii) a condensing lens having a large diameter, and which requires two or more lenses.

In the scanning LiDAR, a precise arrangement operation of an optical system is necessary, and since the number of arrangement targets increases as the number of lenses included in the scanning LiDAR increases, such an arrangement operation becomes a factor which raises a price of the scanning LiDAR.

As described above, the conventional 360° LiDAR scanner needs two or more lenses, and thus there are a plurality of arrangement points due to a transmitting lens and a receiving lens, a detector, and the like. In addition, since a manufacturing cost due to a coating cost and the like according to applying a plurality of lenses is required, there is a limitation in reducing a manufacturing cost per unit.

SUMMARY OF CERTAIN INVENTIVE ASPECTS

The described technology is directed to providing a scanning light detection and ranging (LiDAR) having an optical structure which shares a transmitting and receiving lens and of which a manufacturing cost is reducible to solve a problem in that spread corresponding to demand is not easy due to a high price thereof.

The described technology is also directed to providing a scanning LiDAR having an optical structure, which shares a transmitting and receiving lens, capable of being supplied in a small size and at a low price by simplifying optical structure and minimizing the number of parts.

The described technology is also directed to providing a scanning LiDAR having an optical structure which shares a transmitting and receiving lens, which has a structure capable of sharing a lens which is an integrated transmitting and receiving optical system, and of which an assembly process is simplified.

One aspect of the present invention provides a scanning light detection and ranging (LiDAR) having an optical structure which shares a transmitting and receiving lens including a hole mirror disposed to have a first predetermined angle with respect to a horizontal surface and including a hole and a reflecting surface, a beam source disposed to face a surface opposite the reflecting surface of the hole mirror and configured to output a pulsed laser beam through the hole of the hole mirror, a transmitting and receiving lens configured to generate a collimated beam to move the pulsed laser beam which passed through the hole toward a measurement target, receive a beam reflected from the measurement target, and transmit the reflected beam to the hole mirror, and a beam detector disposed to face the reflecting surface of the hole mirror, and configured to convert the beam reflected from the reflecting surface into an electronic signal.

The first predetermined angle may be 45°, and a beam received by the transmitting and receiving lens and transmitted to the reflecting surface of the hole mirror may reach the hole mirror to have an oval shape due to the 45° angle.

The beam source may be disposed perpendicular to the beam detector.

The beam source and the beam detector may be disposed on the same axis, and the scanning LiDAR may further include a hollow mirror which has a second predetermined angle with respect to the hole mirror to move the pulsed laser beam toward the measurement target through the hole and is disposed in the hole.

The second predetermined angle between the hollow mirror and the hole mirror may be a right angle.

The hollow mirror may pass through the hole of the hole mirror, and a reflecting surface of the hollow mirror may be disposed to face the beam source and the transmitting and receiving lens.

The hole mirror may include the hole, and may be formed in an oval or rectangular shape with a closed outside surface.

The beam source may include a multi-channel beam source configured to output two or more pulsed laser beams corresponding to different channels, the transmitting and receiving lens may generate collimated beams of the two or more pulsed laser beams and may receive two or more beams reflected from the measurement target and corresponding to different channels, and the beam detector may include two or more beam detecting units configured to convert two or more beams reflected from the reflecting surface and corresponding to the different channels into electronic signals.

Effects of a scanning light detection and ranging (LiDAR) having an optical structure which shares a transmitting and receiving lens according to embodiments of the present invention will be described below.

According to at least one of the embodiments of the present, a manufacturing cost of a scanning LiDAR can be reduced to solve a problem in that spread thereof corresponding to a demand is not easy due to a high price thereof.

In addition, according to at least one of the embodiments of the present, the scanning LiDAR can be supplied in a small size and at a low price by simplifying an optical structure and minimizing the number of parts.

In addition, according to at least one of the embodiments of the present, the scanning LiDAR has a structure which shares a lens integrated transmitting and receiving optical system, and an assembly process thereof can be simplified.

DETAILED DESCRIPTION OF CERTAIN INVENTIVE EMBODIMENTS

Hereinafter, embodiments of the present invention will be described in detail with reference to the accompanying drawings, and the same or similar elements are assigned to the same reference numerals regardless of drawing numerals and redundant descriptions thereof will be omitted. Suffixes such as "module" and "part" for elements used in the following description are given or used in combination only in consideration of ease of writing the specification, and do not have distinct meanings or roles in and of themselves. In addition, in descriptions of the described technology, when detailed descriptions of related well-known technology are deemed to unnecessarily obscure the gist of the described technology, they will be omitted. In addition, the accompanying drawings are only provided so that the embodiments disclosed in the specification are easily understood, and a technical concept of the described technology is not limited thereto, but it will be understood that the described technology is to cover all modifications, equivalents, and alternatives falling within the spirit and scope of the described technology.

While such terms as the ordinal numbers "first," "second," etc., may be used to describe various elements, such elements are not limited by these terms. The terms are used only to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements.

Elements of the described technology referred to in singular may number one or more, unless the context clearly indicates otherwise.

It will be further understood that the terms "comprise," "comprising," "include," and/or "including," when used herein, specify the presence of stated features, numbers, steps, operations, elements, components, and/or groups thereof, but do not preclude the presence or addition of one or more other features, numbers, steps, operations, elements, components, and/or groups thereof.

Hereinafter, embodiments will be described in detail with reference to the accompanying drawings. It is clear to those skilled in the art that the described technology may be made in a specific form without departing from the scope and essential features of the described technology.

Figure 1:
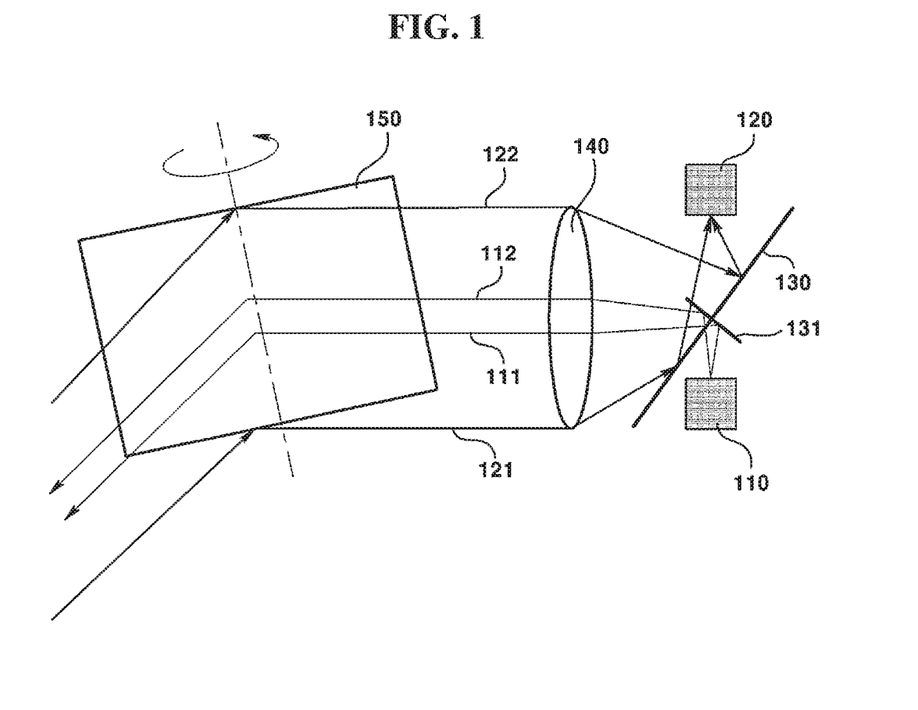
FIG. 1 is a view illustrating a scanning light detection and ranging (LiDAR) having an optical structure which shares a transmitting and receiving lens according to one embodiment of the present invention.

FIG. 1 is a view illustrating a scanning light detection and ranging (LiDAR) having an optical structure which shares a transmitting and receiving lens according to one embodiment of the present invention.

Referring to FIG. 1, the scanning LiDAR having an optical structure which shares a transmitting and receiving lens may include a beam source 110, a beam detector 120, a hole mirror 130, and a transmitting and receiving lens 140, and may further include a rotation mirror 150.

However, when specific functions of the scanning LiDAR having an optical structure which shares a transmitting and receiving lens according to the embodiment of the present invention described with reference to FIG. 1 are introduced, only necessary components are illustrated in FIG. 1, and it is clear to those skilled in the art that various other components may be included in the scanning LiDAR having an optical structure which shares a transmitting and receiving lens.

In addition, although the rotation mirror 150 illustrated in FIG. 1 is illustrated to have a predetermined angle with respect to a horizontal surface, and to rotate while a central axis is inclined, this is for visually dividing and describing paths of pulsed laser beams 111 and 112 or reflected beams 121 and 122 input or output (transmitted or received) to or from the scanning LiDAR having an optical structure which shares a transmitting and receiving lens, and the described technology is not limited to the rotation mirror 150 illustrated in FIG. 1.

First, the beam source 110 may output the pulsed laser beams 111 and 112, and specifically, the beam source 110 may be disposed to face a surface opposite a reflecting surface included in the hole mirror 130 and may output pulsed laser beams through a hole included in the hole mirror 130.

Meanwhile, the beam source 110 included in the embodiment of the present invention may include a multi-channel beam source which outputs two or more pulsed laser beams corresponding to different channels, and a specific example thereof will be described with reference to FIG. 3.

The beam detector 120 may be disposed to face the reflecting surface of the hole mirror 130, may receive the reflected beams 121 and 122, which are reflected and returned from a measurement target, pass through the transmitting and receiving lens 140, reach the reflecting surface of the hole mirror 130, and are reflected by the corresponding reflecting surface, and may convert the reflected beams 121 and 122 into electronic signals. In addition, the beam detector 120 may output the converted electronic signals to the outside.

The hole mirror 130 includes the hole and the reflecting surface, may transmit the pulsed laser beams 111 and 112 output from the beam source 110 to the transmitting and receiving lens 140 through the provided hole, may reflect the reflected beams 121 and 122 which are reflected by the measurement target and pass through the transmitting and receiving lens 140, and may transmit the reflected beams 121 and 122 to the beam detector 120 using the provided reflecting surface.

Meanwhile, the hole mirror 130 may be disposed to have a first predetermined angle with respect to the horizontal surface, and here, the first predetermined angle may be 45°. When beams reflected by the measurement target are received by the transmitting and receiving lens 140 and transmitted to the hole mirror, a shape of the transmitted reflected beams may be an oval shape due to the first predetermined angle.

As described above, in the scanning LiDAR having an optical structure which shares a transmitting and receiving lens according to the embodiment of the present invention, although loss may occur due to the hole included in the hole mirror 130, an amount of loss is not large because the reflected beams, which reach the hole mirror 130 which is a gate of the beam detector 120, reach the reflecting surface of the hole mirror 130 in the oval shape.

The transmitting and receiving lens 140 is disposed between the reflecting surface of the hole mirror 130 and the rotation mirror 150, and serves to condense pulsed laser beams and generate the collimated beams 111 and 112 so that the pulsed laser beams, which move toward the measurement target, directly move toward the measurement target, to receive the beams 121 and 122 reflected by the measurement target, and to transmit the beams 121 to the hole mirror 130. That is, in the scanning LiDAR having an optical structure which shares a transmitting and receiving lens according to the embodiment of the present invention, functions individually performed by a collimation lens and a condensing lens which are individual lenses in a conventional scanning LiDAR may be performed by one lens 140 which is the transmitting and receiving lens 140.

As a result, according to the embodiment of the present invention, the number of arrangement points of an optical system is reduced compared to the conventional scanning LiDAR, the number of process of precise arrangement operations, a coating process, and the like are reduced, and thus a manufacturing cost can be reduced and an assembly process can also be simplified.

Meanwhile, the scanning LiDAR having an optical structure which shares a transmitting and receiving lens illustrated FIG. 1 has a structure in which the beam source 110 and the beam detector 120 are disposed on the same axis. To this end, the scanning LiDAR having an optical structure which shares a transmitting and receiving lens illustrated FIG. 1 may further include a hollow mirror 131 configured to move pulsed laser beams output from the beam source 110 to the measurement target through the hole included in the hole mirror 130.

Specifically, the hollow mirror 131 may be disposed to have a second predetermined angle with respect to the hole mirror 130, and here, the second predetermined angle may be a right angle (90°). In addition, the hollow mirror 131 may be disposed to pass through the hole included in the hole mirror 130, and a reflecting surface of the hollow mirror 131 may be disposed to face the beam source 110 and the transmitting and receiving lens 140.

As a result, scanning in the scanning LiDAR having an optical structure which shares a transmitting and receiving lens according to the embodiment of the present invention is performed through the hollow mirror 131 by disposing the beam source 110 and the beam detector 120 on the same axis.

Figure 2:
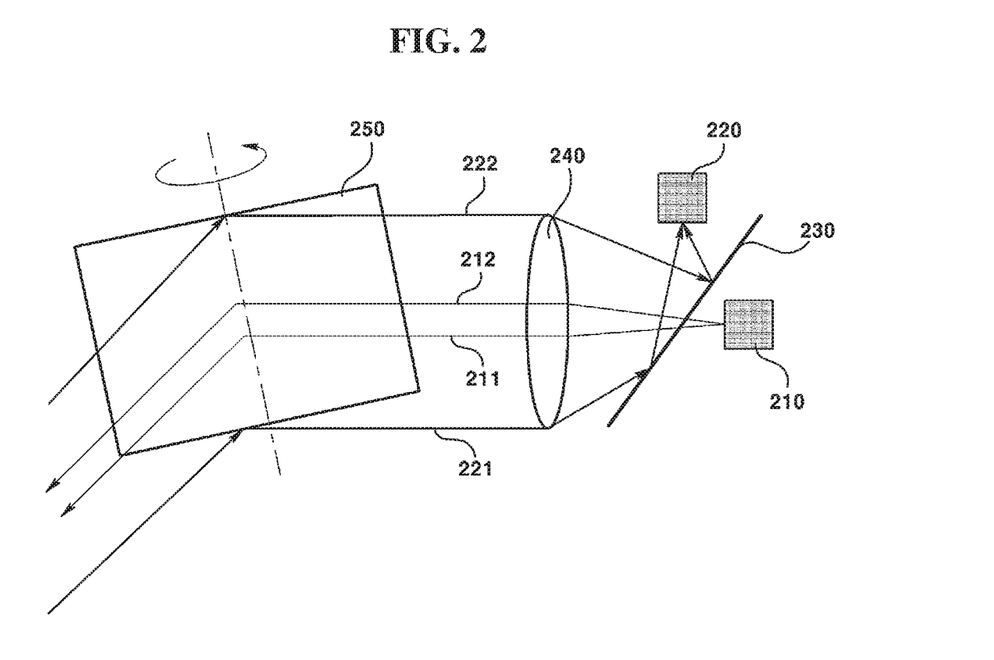
FIG. 2 is a view illustrating a scanning LiDAR having an optical structure which shares a transmitting and receiving lens according to another embodiment of the present invention.

FIG. 2 is a view illustrating a scanning LiDAR having an optical structure which shares a transmitting and receiving lens according to another embodiment of the present invention.

Referring to FIG. 2, the scanning LiDAR having an optical structure which shares a transmitting and receiving lens may include a beam source 210, a beam detector 220, a hole mirror 230, and a transmitting and receiving lens 240, and may further include a rotation mirror 250. Although many portions of the scanning LiDAR having an optical structure which shares a transmitting and receiving lens illustrated in FIG. 2 are similar to that of FIG. 1, the beam source 210 and the beam detector 220 are not disposed on the same axis, but disposed perpendicularly to each other (90°).

Due to such a perpendicular arrangement between the beam source 210 and the beam detector 220, the scanning LiDAR having an optical structure which shares a transmitting and receiving lens illustrated in FIG. 2 may carry out a scanning function even when the hollow mirror 131 described with reference to FIG. 1 is not included.

Specifically, the beam source 210 may output pulsed laser beams 211 and 212, and the beam source 210 is disposed to face a surface opposite a reflecting surface included in the hole mirror 230 and may directly output the pulsed laser beams toward a hole included in the hole mirror 230.

Meanwhile, the beam source 210 illustrated in FIG. 2 also may include a multi-channel beam source which outputs two or more pulsed laser beams corresponding to different channels, and a specific example of thereof will be described with reference to FIG. 3.

In addition, since components 230, 240, and 250 other than the above-described perpendicular arrangement between the beam source 210 and the beam detector 220 and the hollow mirror are the same as the components 130, 140, and 150 illustrated in FIG. 1, redundant descriptions will be omitted.

Figure 3:
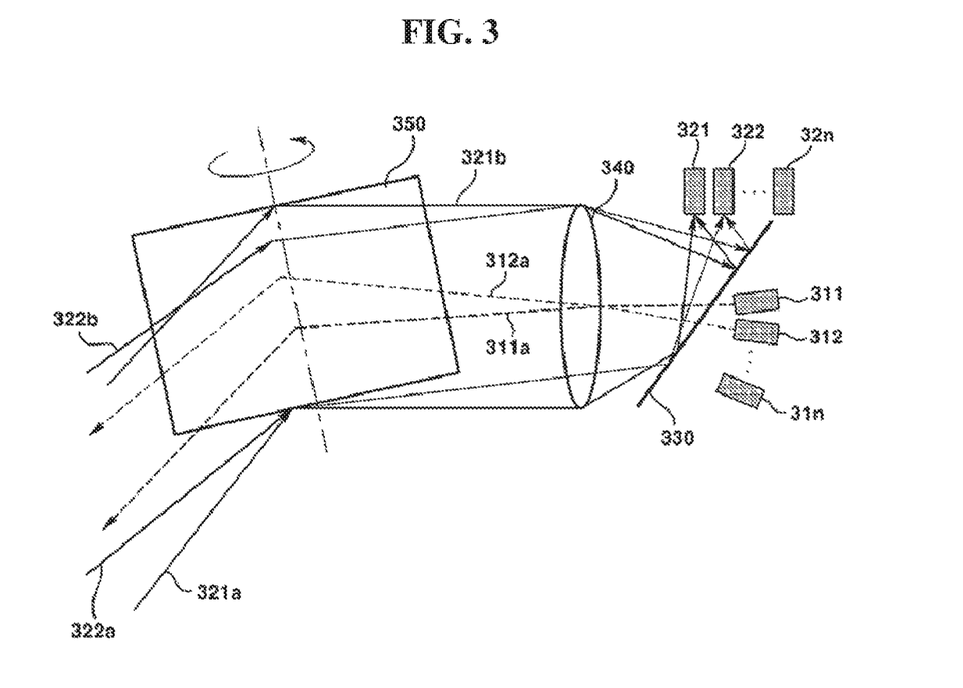
FIG. 3 is a view illustrating a scanning LiDAR having an optical structure which shares a transmitting and receiving lens according to still another embodiment of the present invention.

FIG. 3 is a view illustrating a scanning LiDAR having an optical structure which shares a transmitting and receiving lens according to still another embodiment of the present invention.

Referring to FIG. 3, the scanning LiDAR having an optical structure which shares a transmitting and receiving lens may include beam sources 311, 312, and 31n, beam detectors 321, 322, and 32n, a hole mirror 330, and a transmitting and receiving lens 340, and may further include a rotation mirror 350.

Although the scanning LiDAR having an optical structure which shares a transmitting and receiving lens illustrated in FIG. 3 is the scanning LiDAR having an optical structure which shares a transmitting and receiving lens described with reference to FIGS. 1 and 2, and particularly, is very similar to the scanning LiDAR having an optical structure which shares a transmitting and receiving lens illustrated in FIG. 2, the scanning LiDAR having an optical structure which shares a transmitting and receiving lens illustrated in FIG. 3 is an example including multi-channel beam sources 311, 312, and 31n which output a plurality of channel beams (multi-channel) and a plurality of beam detecting units.

That is, the scanning LiDAR having an optical structure which shares a transmitting and receiving lens illustrated in FIG. 3 may output pulsed laser beams 311a and 312a using multi-channel beam sources 311, 312, and 31n which output two or more pulsed laser beams corresponding to different channels and are not one beam source.

In addition, the scanning LiDAR having an optical structure which shares a transmitting and receiving lens illustrated in FIG. 3 may generate the collimated beams 311a and 312a of two or more pulsed laser beams output from the multi-channel beam source 311, 312, and 31n using the transmitting and receiving lens 340. In addition, the scanning LiDAR having an optical structure which shares a transmitting and receiving lens may receive two or more reflected beams 321a, 321b, 322a, and 322b which are reflected by a measurement target and correspond to different channels, and may transmit the two or more reflected beams 321a, 321b, 322a, and 322b to the hole mirror 330.

In addition, the scanning LiDAR having an optical structure which shares a transmitting and receiving lens illustrated in FIG. 3 may receive two or more reflected beams, which are reflected by a reflecting surface of the hole mirror 330 and correspond to different channels, and may convert two or more reflected beams into electronic signals using the beam detectors 321, 322, and 32n including two or more beam detecting units.

Although the scanning LiDAR having an optical structure which shares a transmitting and receiving lens illustrated in FIG. 3 is a modified example of the scanning LiDAR having an optical structure which shares a transmitting and receiving lens illustrated in FIG. 2, the described technology is not limited thereto and includes an example modified such that the scanning LiDAR having an optical structure which shares a transmitting and receiving lens described with reference to FIG. 1 includes a multi-channel beam source which outputs a plurality of channel beams and a plurality of beam detecting units.

Figure 4:
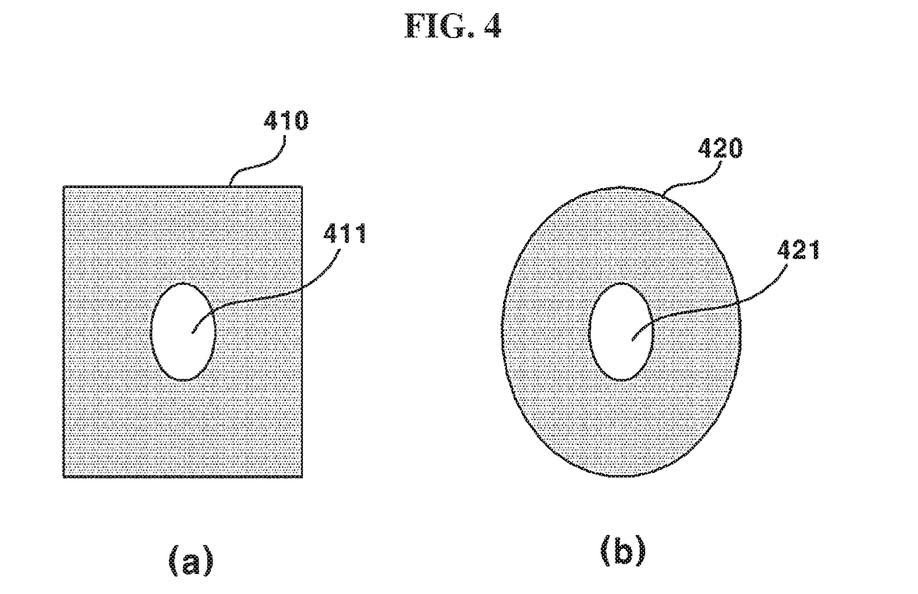
FIG. 4 is a view illustrating an example of a hole mirror included in the scanning LiDAR having an optical structure which shares a transmitting and receiving lens according to the embodiments of the present invention.

FIG. 4 is a view illustrating an example of a hole mirror included in the scanning LiDAR having an optical structure which shares a transmitting and receiving lens according to the embodiments of the present invention.

Referring to FIG. 4A, a hole mirror 410 may include a hole 411 and be formed in a rectangular shape with a closed external surface. In addition, referring to FIG. 4B, a hole mirror 420 may include a hole 421 and be formed in an oval shape with a closed outside surface.

The hole mirrors 410 and 420 illustrated in FIGS. 4A and 4B are only specific examples, and the hole mirrors 410 and 420 included in the scanning LiDAR having an optical structure which shares a transmitting and receiving lens according to the embodiment of the present invention may include holes and be variously formed in an oval or rectangular shape with a closed outside surface.

As a result, the scanning LiDAR having an optical structure which shares a transmitting and receiving lens according to the embodiment of the present invention can solve a problem that spread corresponding to demand is not easy due to the high price by reducing a manufacturing cost, can be supplied in a small size and at a low price by simplifying a structure of an optical system and minimizing the number of components, and can simplify an assembly process.

Accordingly, the above descriptions are not to be construed as limiting in all aspects but should be considered as exemplary embodiments. The scope of the present invention should be determined by reasonable interpretation of the appended claims, and all modifications within an equivalent range of the present invention are encompassed in the scope of the present invention.

The invention claimed is:

1. A scanning light detection and ranging (LiDAR) comprising:
   a hole mirror disposed to have a first angle with respect to a horizontal surface and including a hole and a reflecting surface;
   a beam source configured to output a pulsed laser beam from one side of the hole mirror toward the hole;
   a transmitting and receiving lens configured to generate a collimated beam from the pulsed laser beam which passed through the hole toward a measurement target, receive a beam reflected from the measurement target, and transmit the reflected beam to the hole mirror;
   a beam detector disposed to face the reflecting surface of the hole mirror and configured to receive the beam reflected from the hole mirror and convert the reflected beam into an electronic signal; and
   a hollow mirror disposed in the hole of the hole mirror and having a second angle with respect to the hole mirror to direct the pulsed laser beam toward the measurement target through the hole of the hole mirror,
   wherein the reflecting surface of the hole mirror is disposed to face the transmitting and receiving lens,
   wherein the beam source is disposed to face a surface of the hole mirror that is opposite to the reflecting surface of the hole mirror, and
   wherein the beam source and the beam detector are disposed on the same axis.

2. The scanning LiDAR of claim 1, wherein:
   the first angle is 45°; and
   a beam received by the transmitting and receiving lens and transmitted to the reflecting surface of the hole mirror reaches the hole mirror in an oval shape due to the 45° angle.

3. The scanning LiDAR of claim 1, wherein the second angle between the hollow mirror and the hole mirror is a right angle.

4. The scanning LiDAR of claim 1, wherein:
   the hollow mirror passes through the hole of the hole mirror.

5. The scanning LiDAR of claim 1, wherein the hole minor is formed in an oval or rectangular shape with a closed outside surface.

6. The scanning LiDAR of claim 1, wherein:
   the beam source includes a multi-channel beam source configured to output two or more pulsed laser beams corresponding to different channels;
   the transmitting and receiving lens is configured to generate collimated beams from the two or more pulsed laser beams and to receive two or more beams reflected from the measurement target and corresponding to different channels; and
   the beam detector includes two or more beam detecting units configured to convert the two or more beams reflected from the reflecting surface of the hole mirror and corresponding to the different channels into electronic signals.

7. The scanning LiDAR of claim 1, further comprising a rotation mirror configured to reflect the collimated beams to direct the collimated beams toward the measurement target while rotating, and configured to reflect beams reflected from the measurement target toward the transmitting and receiving lens while rotating.

\* \* \* \* \*